(12) United States Patent
Wilson

(10) Patent No.: US 6,834,839 B1
(45) Date of Patent: Dec. 28, 2004

(54) PRISM POLE STAND WITH CLAMPING DEVICE AND ASSEMBLY

(76) Inventor: Eldridge W. Wilson, 4042 Sunkist St., Palmdale, CA (US) 93551

( * ) Notice: Subject to any disclaimer, the term of this patent is extended or adjusted under 35 U.S.C. 154(b) by 0 days.

(21) Appl. No.: 10/278,487

(22) Filed: Oct. 22, 2002

(51) Int. Cl.$^7$ ............................................... G01C 15/00
(52) U.S. Cl. ............................... 248/316.6; 248/316.1; 248/230.1; 33/290; 33/296
(58) Field of Search .................. 248/316.1, 316.6, 248/540, 230.1, 230.3, 230.5, 124.1, 124.2, 163.1, 432; 33/290–296

(56) References Cited

U.S. PATENT DOCUMENTS

| | | | | |
|---|---|---|---|---|
| 1,175,392 A | * | 3/1916 | White | |
| 2,469,904 A | * | 5/1949 | Szuba | 248/124 |
| 2,727,325 A | * | 12/1955 | Jurinic | 41/4 |
| 2,984,443 A | * | 5/1961 | Bergengren | 248/124 |
| 3,565,380 A | * | 2/1971 | Langren | 248/229 |
| 4,190,224 A | * | 2/1980 | LeBlanc et al. | 248/229 |
| 4,192,076 A | * | 3/1980 | Hall | 33/296 |
| 4,290,207 A | * | 9/1981 | Browning et al. | 33/295 |
| 4,889,301 A | * | 12/1989 | Yerkes | 248/124 |
| 4,932,620 A | * | 6/1990 | Foy | 248/124 |
| 5,128,838 A | * | 7/1992 | Brandess | 362/18 |
| 5,385,324 A | * | 1/1995 | Pryor et al. | 248/231.7 |
| 5,516,021 A | * | 5/1996 | Douglass | 224/407 |

* cited by examiner

Primary Examiner—Leslie A. Braun
Assistant Examiner—Steven Marsh
(74) Attorney, Agent, or Firm—Frank L. Zugelter

(57) ABSTRACT

A device (10) for clamping and unclamping a standing prism pole (11) within a surveying instrument (13). A pair of opposing vise or jaw members (24, 25) are disposed with a geometrical configuration (18) forming a frame (19) having a cavity (20), the one vise (24) within cavity (20) fixedly mounted to frame (19), the other vise (25) within cavity (20) slidably movable towards and away from vise (24), and by which the standing prism pole (11) is clamped and unclamped by the jaw members (24, 25). A spacer arm (34) connects frame (19) to a support leg (37) of instrument (13). At the bottom of leg (37) a carrying handle (39) is connected for ease of moving instrument (13) from one point to another in either collapsed or uncollapsed mode for instrument (13).

10 Claims, 3 Drawing Sheets

PRISM POLE STAND WITH CLAMPING DEVICE AND ASSEMBLY

TECHNICAL FIELD

This invention is directed to a clamping device about a prism pole and its assembly to a bipod surveying instrument, and in particular, to a device tightly clamping against the prism pole and its assembly to the bipod's legs.

BACKGROUND TO THE INVENTION

Various devices for leveling and plumbing surveying instruments are known in the art, such as disclosed in U.S. Pat. Nos. 3,863,945; 4,290,207; 4,648,697; 5,397,086; 5,865,401; and 6,008,957.

Stability of prism poles in the present state-of-the-art bipods is not as efficient as desired. Also, there is a need for a prism pole stand which not only measures distances between points in conventional surveying procedures, but one which is interchangeable for use in Global Positioning System [GPS] surveying procedures. This invention provides for better and greater stability in bipod instruments by off-setting the prism pole stand from a bipod as well as being more useful in both kinds of surveying procedures, the conventional and the GPS procedures. The invention retains simplicity for both procedures, in the physical parameters of the device and bipod without becoming cumbersome. The subject matter of this invention meets the desired goal of simplicity for maintaining the level and plumb for a bipod instrument in any of its stationary surveying positions.

SUMMARY OF THE INVENTION

The invention is directed to a clamping device for a prism pole and its connection to a pair of legs, usually telescopic in nature, of a bipod surveying instrument, and is found in a pair of vise members, one of which advances and retracts to and from the other, so as to be able to clamp a prism pole between their faces. A frame and its vise members are secured to a spacer arm at a right angle thereto, while the spacer arm in turn is secured at a right angle to a support bar or leg operatively connected to the bipod's pair of legs. The support leg extends upwardly and is connected at the top of the bipod to a universal assembly for the telescopic legs and the support leg. The universal assembly provides for a horizontally-oriented swing about the support leg for each of the legs independently of the other, as well as a vertically-oriented pivoting action for each of the legs independently of the other, thereby providing for positioning separately each of the pair of legs at their desired points. At the same time the support leg is placed in a vertical position so that a level attached to the prism pole in its off-set stand position that is clamped by the device of this invention reads a level signal to the surveyor and signals to the surveyor that the prism pole is in a true plumb orientation for carrying a surveying measurement.

The device's frame is incorporated into a geometrical construction having a continuous structure serving to enclose a cavity between an open top and an open bottom of the device. The frame is formed preferably in a rectangular configuration. One of the vise members is securely mounted or fixed in place interiorly of or to a first of a pair of opposing walls of the frame by a pair of bolts threaded adjacent their ends and which bolts extend from the support leg and into and through the spacer member or arm and through the first of such walls to thread to the one vise member through the latter's backside. The other or second vise member is disposed within the frame in opposing relationship to the first vise member so that the corresponding faces of the vise members may clamp to a periphery, surface, or annular wall of the prism pole introduced to, or placed, within the cavity of the frame. The second vise member is held in a slidable mode in its position in the frame by its connection to a threaded shaft that extends through a threaded bore in a second of the pair of opposing walls of the frame. A finger-sized handle is fixed to the other end of the shaft to provide for a manual turning of the threaded shaft, which when turned advances or retracts its movable (second) vise member in the cavity towards and away from the first vise member, clamping and unclamping about a prism pole that has been introduced into the cavity.

A hand-sized handle and its threaded stem is attached to the bottom of the support leg to provide ease of carrying the bipod instrument, particularly in its collapsed mode for the legs, and with or without a prism pole installed in the frame.

One or more threaded bores are provided in one or more other walls of the frame and by which holders or trays or the like may be threadedly connected to the instrument, for carrying data, paper, writing instruments, etc., for use by a surveyor to record information obtained from measurement by the surveying instrument.

An object of this invention is to provide a novel clamping mechanism or device for a prism pole for inclusion in a bipod surveying instrument.

Another object of this invention is to provide for better stability in a positioned bipod surveying instrument by off-setting the prism pole's stand.

A further object of this invention is to provide an efficient and effective clamping device or mechanism for a prism pole of a bipod surveying instrument.

Yet another object of this invention is to provide for ease of carrying the bipod instrument from one location to another during a surveying procedure.

These and other objects and advantages of the invention will become more apparent from a fill and complete reading of the following description, its appended claims, and the accompanying drawing comprising three (3) sheets of five (5) FIGURES.

BEST MODE FOR CARRYING OUT THE INVENTION

Figures 1, 2:
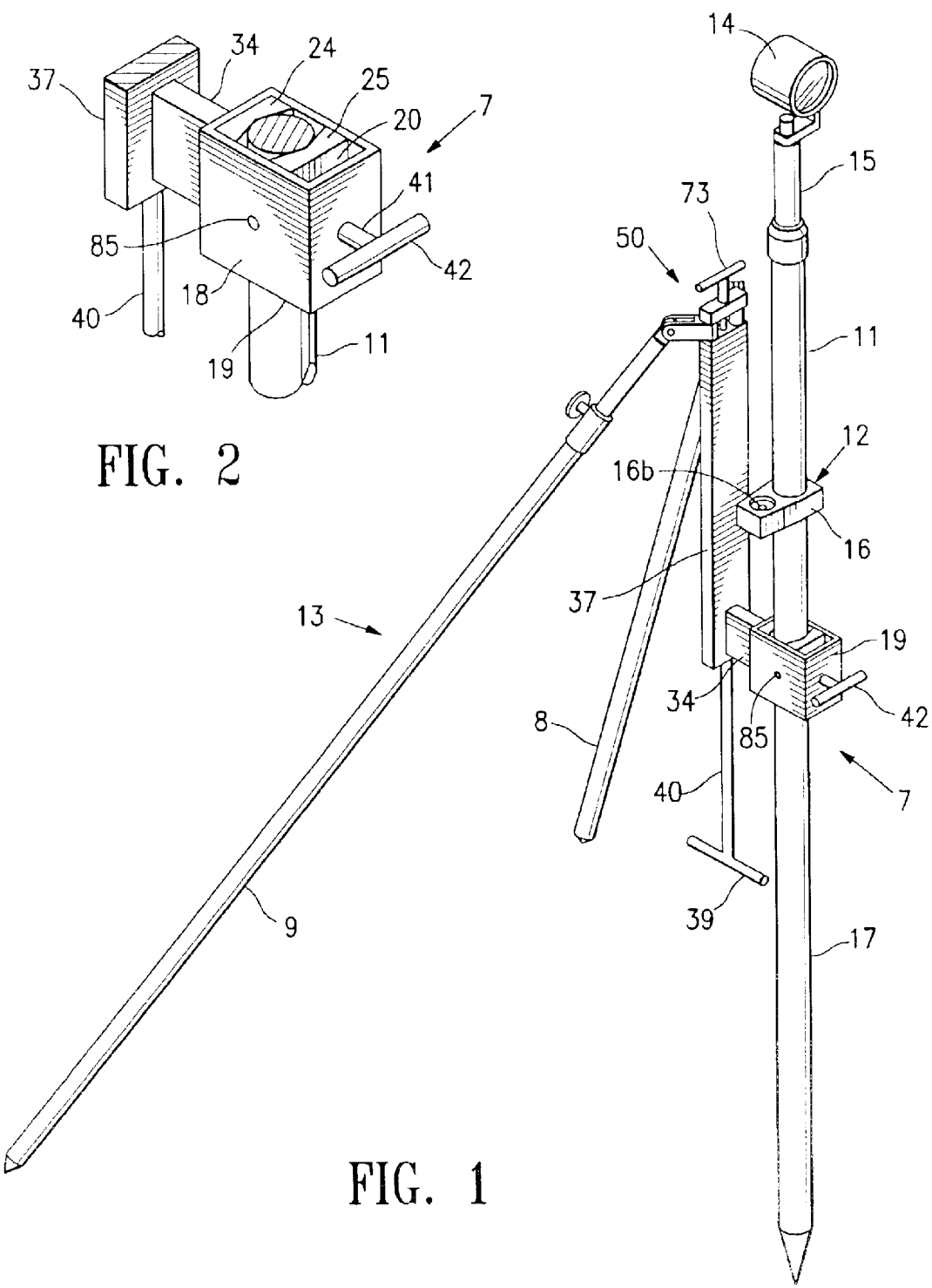
FIG. 1 is a perspective view of a bipod surveying instrument to which the subject matter of the invention is connected.
FIG. 2 is a perspective fragmentary view of the clamping mechanism or device and other elements of the invention.

Turning to the FIGURES in which reference characters correspond to like numerals hereinafter, the present invention, FIGS. 1, 2, is embraced by a device 7 for holding a prism pole 11 and its level 12 in the pole's assembly to a surveying instrument or bipod 13 that includes a pair of legs 8, 9, preferably telescopic in conventional manner relative to the top of a leg 15, preferably telescopic in nature, of prism pole 11. A conventional surveying prism 14, such as Model 6422-00-YLB, Seco Manufacturing Company, Inc. 4155 Oasis Road, Redding Calif. 96003 USA, is suitably rotatably mounted in conventional manner to the top of leg 15 of prism pole 1. A conventional level-bubble housing 16, with level bubble 16b, is suitably securely attached at a right angle to a lower (if necessary) leg 17, if necessary, of prism pole 11, preferably in proximity to or along the length of leg 17 adjacent to the position of device 7. Device 7 is formed in a geometrical configuration 18, FIG. 2, preferably having a continuous structure, such as a practical frame 19 preferably in the form of walls of a rectangular box or formation. Frame 19 serves to enclose a cavity 20, FIGS. 2, 3, 4, within the frame's walls 21 between an open top 22 and an open bottom 23, FIG. 3, which terminate the height and depth respectively of walls 21. A pair of vise members or jaws 24, 25, are disposed, preferably totally within cavity 20, the one vise member or jaw 24 being fixed to a first one 21-1 of walls 21. A face 26, FIG. 4, on jaw 24 is configured to abut or engage, substantially mating with the peripheral or annular or other surface 27, FIGS. 3, 4, of lower leg 17 of prism pole 11 in the operation of the invention. The center of the geometrical configuration 18 lies preferably in a plane bisecting the width of jaw 24, or coincidentally with the center of frame 19 when the width of jaw 24 extends to abut opposing walls 21-3 and 21-4 of frame 19, so as to engage surface 27 in an effective clamping mode to leg 17 for surveying purposes which are to follow in carrying out practice of the invention. The other or second vise member or jaw 25, disposed and slidably movable within frame 19, includes a face 28 congruous to and in alignment with face 26, mirroring the latter in the operation of the invention. Jaw 25 within cavity 20 is in an opposing relationship to jaw 24 and is situated adjacent to a second one 21-2 of opposing walls 21, to advance towards and retract from an introduced leg 17 of prism pole 11, so that both vise or jaw members 24, 25 may clamp against and hold secure prism pole 11 to themselves or unclamp from prism pole 11 in the operation of the invention.

Figure 3:
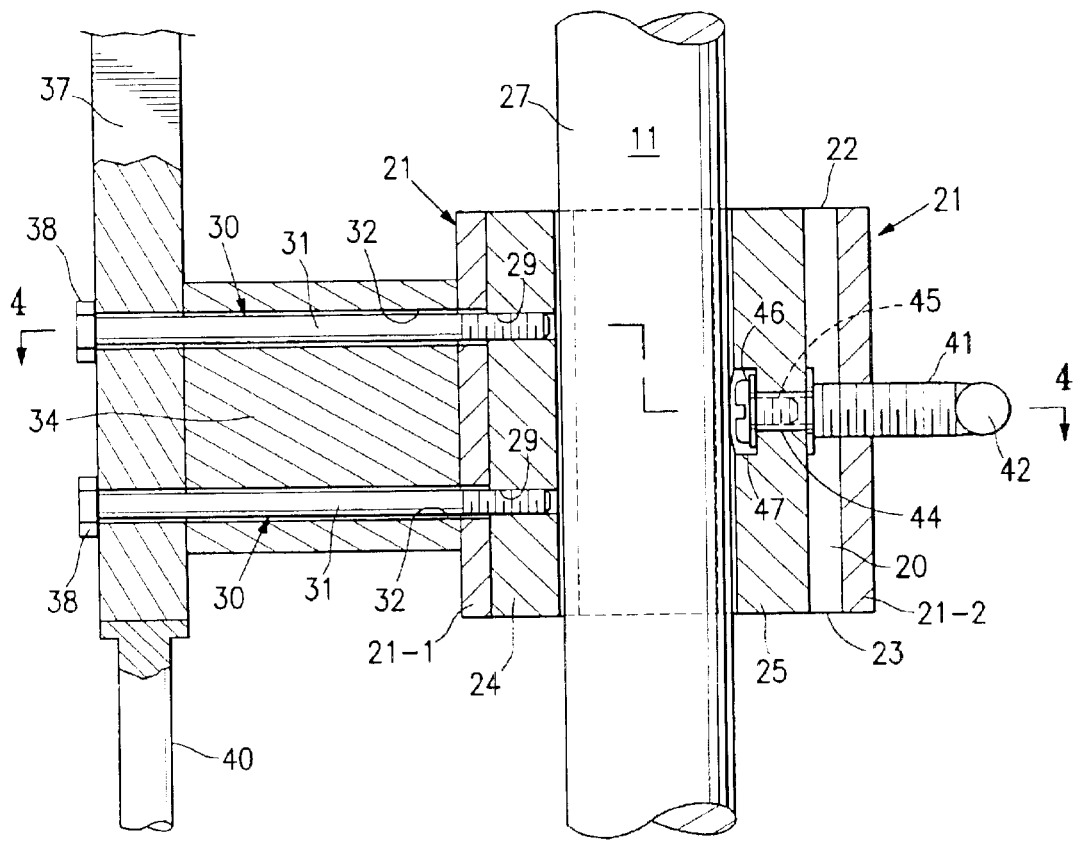
FIG. 3 is an enlarged fragmentary elevational view of the FIG. 2 view, partly in cross-section, of the clamping device and other elements of this invention.

The fixed position of jaw 24 abutting wall 21-1 in frame 19 is provided, FIG. 3, by jaw 24 including spaced threaded bores 29 into which corresponding threads of bolts 30 are applied. The shanks 31 above the threads of threaded bolts 30 project through the one wall 21-1 and continue to traverse corresponding bores 32 in a stabilizing spacer arm 34 for spacing device 7 from a support member or third leg 37 for instrument 13 and connecting device 7 with bipod instrument 13. Spacer arm 34 abuts the exterior of wall 21-1 at the arm's one edge and abuts the one side of support leg 37 at its other edge in the tightened assembly of frame, spacer arm, and support leg, the prism pole stand thus being off-set from instrument 13. The bolts 30 continue to extend through support leg 37, having heads 38 thereon at their other ends, device 7 being thereby securely fastened to support leg 37 by tightened bolts 30. A carrying-handle 39 integral to its stem 40, FIG. 1, is suitably attached to support leg 37 at its bottom to provide for carrying instrument 13 in either a full or partial collapsed mode when device 7 is coupled to support leg 37.

Moveable or slidable jaw 25 is situated within cavity 20 of frame 19 and located adjacent to wall 21-2 of frame 19 in opposing relationship to wall 21-1. Wall 21-2 is threaded for introduction of a threaded shaft 41 that projects outwardly of both of the sides or surfaces of wall 21-2. A finger-turning handle 42 is suitably secured to the exterior end of shaft 41. The other end of shaft 41 is reduced in size, as at neck 44, FIGS. 3, 4, the reduced size including an internally threaded bore 45. A screw-and-washer assembly 46 is threaded to bore 45, the screw's head being positioned in a recess 47, FIG. 3, provided in face 28 of jaw 25 so that face 28 itself engages surface 27 of prism pole 11 while the assembly 46 secures shaft 41 and its handle 42 to slidable jaw 25.

The vertically-oriented center lines of support leg 37 and faces 26, 28 of vise members 24, 25 are disposed in co-planar relationship with themselves and the center line of spacer arm 34, with faces 26, 28 substantially in parallel alignment with support leg 37. Consequently, in operation of the invention, prism pole 11 in instrument 13 is maintained by spacer arm 34 in parallel relationship to support leg 37 so that the center lines of faces 26, 28 on the vise members 24, 25, as they mate with the surface 27 of prism pole 11, are co-planar with those of spacer arm 34 and support leg 37. Consequently, level 16b in its housing 16, and suitably and conventionally situated at a right angle to prism pole 11 (at a readable height), in turn accurately portrays a true vertical alignment of prism pole 11 when bubble 16b is read as being level, in carrying out operation of the invention.

Figure 5:
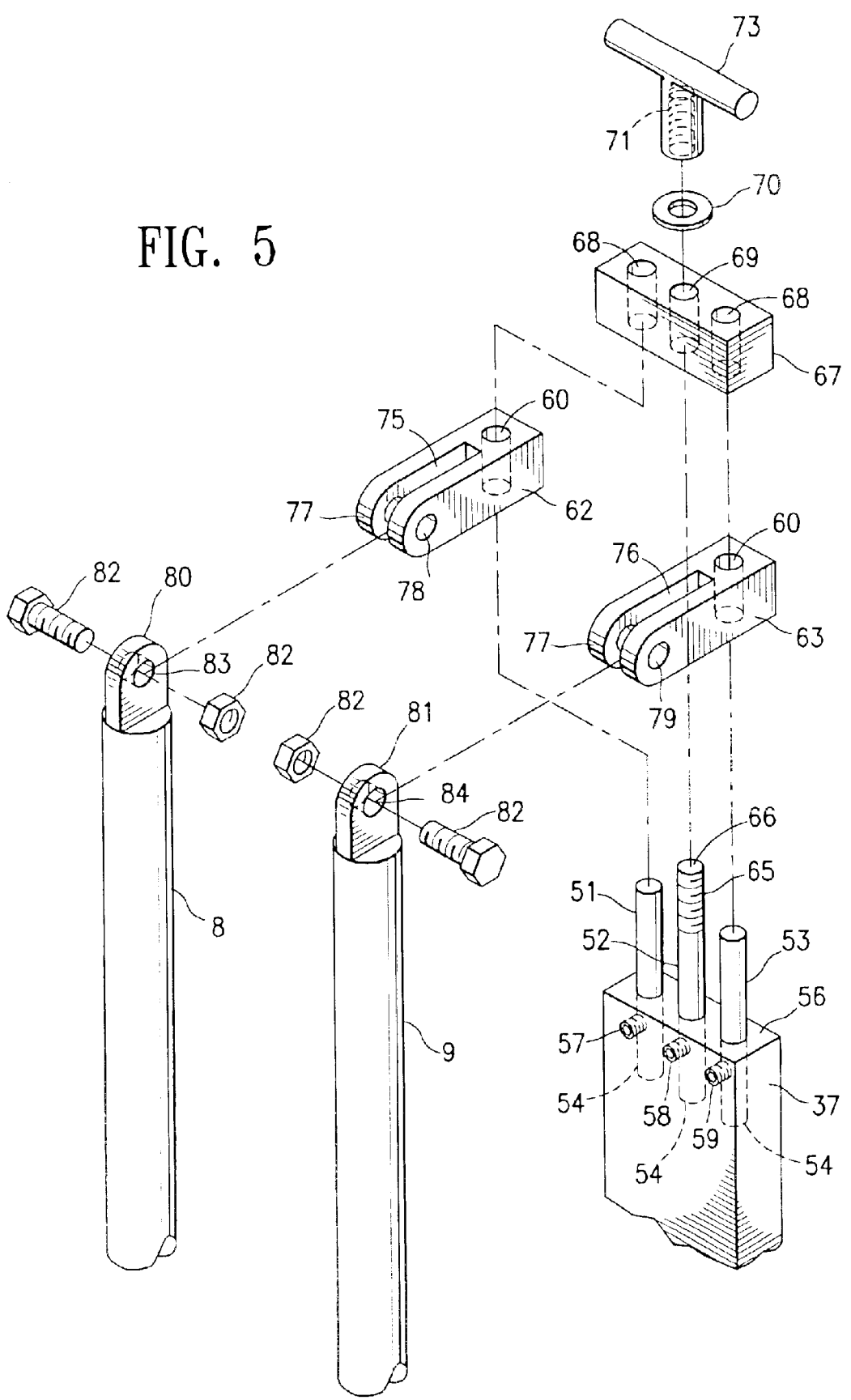
FIG. 5 is a perspective exploded fragmentary view of a universal connecting assembly at the top of the bipod instrument, utilized in carrying out in practice this invention.

A universal assembly 50, FIGS. 1, 5, of elements joins together legs 8, 9 and support leg 37 at the top of instrument 13. Three spaced pins 51, 52, 53, FIG. 5, are seated in their corresponding holes 54 in support leg 37 from its top 56, and fixedly held in place by set screws 57, 58, 59, respectively extending through them across the width of support leg 37. Opened bores 60 in a pair of spaced slotted links 62, 63 mount upon pins 51 and 53, these pins projecting beyond the top of links 62, 63. Pin 52 extends to a greater height above links 62, 63 than do pins 51 and 53, having a threaded portion 65 extending to its top end 66. A cap 67 mounts to pins 51, 52, 53, above slotted links 62, 63, by means of pins 51 and 53 being fitted to their corresponding open bores 68 in cap 67, though pins 51, 53 not projecting past the top of cap 67. Pin 52 projects beyond its own open bore 69 in cap 67. A washer 70 and threaded interior bore 71 of a finger-handle member 73 fit to pin 52 upon mounting cap 67 to the three pins 51, 52, 53, and the tightening of member 73 to pin 52 secures cap 67 and the pair of slotted links 62, 63 mounted to pins 51 and 53 to the top 56 of support leg 37.

Links 62, 63 include like-slots 75, 76 extending inwardly from their terminal ends 77, towards the bores 60. Adjacent each of terminal ends 77, aligned bores 78, 79 are formed for introduction of reduced end portions 80, 81 of the legs 8, 9, into their corresponding slots 75, 76 of links 62, 63. Fasteners 82, such as nutted bolts, extend through bores 78, 79 of slotted links 62, 63, and bores 83, 84 formed in reduced end portions 80, 81 of legs 8, 9, to join together legs 8, and 9, slotted links, 62 and 63 and support leg 37. Assembly 50 provides for a universal motion, rotatable, swingable and pivotal in nature, for the instrument's legs 8 and 9, and support leg 37, for the purpose of properly and in a stable manner positioning instrument 13 at a desired surveying location on whatever ground topography there may be at the point of location for instrument 13.

Figure 4:
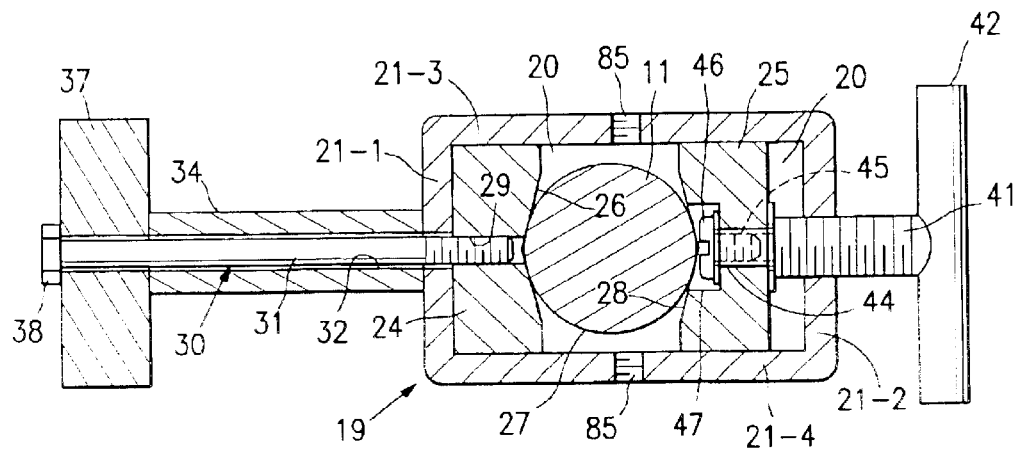
FIG. 4 is a plan view taken on line 4—4 of FIG. 3.

Bores 85, FIG. 4, one or more in either of walls 21-3, 214, are formed, for attaching an accessory such as tray (not shown) for holding paper, utensils, or to hang a surveyor's clipboard, or the like, for recording surveying data or for other uses.

The assembly of universal assembly 50 and leg 37 is addressed by the three (3) preceding paragraphs. In one way of assembly of device 7, after fabrication of the elements forming universal assembly 50 and assembling them together with support leg 37, as illustrated by FIG. 5, spacer arm 34 is joined to leg 37 by bolts 30 being inserted from the backside of leg 37 through it and through spacer arm 34 and thence through wall 21-1 for threading to vise member or jaw 24 that has been positioned within cavity 20; these assembling steps performed without prism pole 11 being within cavity 20. Jaw member 25 is then placed within cavity 20, its face 28 directed towards face 26, after which threaded shaft 41 is threaded through wall 212 and its reduced threaded portion 44 threaded to threaded bore 45, all by means of turning handle 42 to which shaft 41 has been already fixedly coupled. Screw-and-washer assembly 46 in its recess 47 of jaw 25 is tightened in threaded bore 45 so that jaw 25 becomes slidable within cavity 20 as handle 42 is turned.

In operation, prism pole 11 is introduced into cavity 20, and at a desired level of its length positioned within cavity 20. With jaw members 24, 25 within cavity 20, handle 42 is turned to slide face 28 of vise member 25 against the pole's surface 27, the handle 42 continuing to be turned until pole 11 is clamped between faces 28, 26 of members 25, 24, respectively. The stand of prism pole 11 and device 7 are now operative. Carrying handle 39 is utilized in carrying bipod 13, with or without prism pole 11, in its full collapsed mode wherein legs 8 and 9 are pivoted towards support leg 37 to their fullest extent, an example of use of such full collapsed mode being to lean bipod 13 against one's shoulder as a hand grasps handle 39 for carrying the bipod to another point of surveying. Moving bipod 13 about its point of surveying at which it is positioned does not require the full collapse of legs 8 and 9 as the latter are freely pivotal by hand to move instrument 13 about such point of surveying or to a new point of surveying inches away so to speak.

Steel is preferred for the bipod's legs while the vise may be fabricated from aluminum. The materials and their fabrication forming universal assembly 50 and the other elements in device 7 are well known in the art for manufacturing and assembling instrument 13.

Various modifications and changes in the subject matter of the invention may be made without varying from its inventive concept which includes as well subject matter found in an artist's easel and in a camera's tripod. Faces 26, 28, one or both of them, need not be congruous to the annular or another surface of prism pole 11. Frame 19 itself may include an integrally formed vise member 24. Frame 19 need not be of a rectangular formation. Legs 15 and 17 and prism pole 11 need not be telescopic (one inside the other) in nature. The holding means 85 in walls 21-3, 21-4 are not limited to holding an article such as a tray but extends to hanging an article onto one or more of the walls 21-3, 21-4 and to which other articles may be attached. The invention is not limited to employment only with universal assembly 50 as other universal assemblies which provide pivotal, swingable, and/or rotatable features to a surveying instrument are also available for use in carrying out practice of the invention.

I claim:

1. In a surveying instrument comprising a bipod having a pair of legs and a support leg, the support leg and pair of legs universally connected together at the top of the bipod and extending downwardly, a device for clamping a pole thereby connecting it to said instrument, said device including a pair of opposing jaws enclosed within a cavity of a frame for said device, the cavity being open to a top and to a bottom of said frame for disposition of a pole that is clamped by and unclamped from said pair of opposing jaws, the first of said jaws being fixed in the cavity to said frame, the second of said jaws slidably movable towards and away from said first of said jaws, spacer means connecting together said device and said support leg, and means for advancing and retracting said second of said jaws to and from said first of said jaws, said spacer means comprising a stabilizing arm, and bolt means extending from said first one of said jaws, through said frame, through said stabilizing arm, and through said support leg, thereby securely joining them together in the assembly of said device to the surveying instrument.

2. In the surveying instrument of claim 1, said bolt means comprising at least one threaded bolt, said first one of said jaws including a threaded bore, said one threaded bolt threaded to said threaded bore in said first one of said jaws thereby fixing said first one of said jaws in said frame.

3. In the surveying instrument of claim 1, said advancing and retracting means comprising a handle threadedly attached to said frame and extending through said frame and attached to said second one of said jaws in opposing relationship to said first one of said jaws.

4. In the surveying instrument of claim 1, in said support leg having a bottom, and a carrying handle for said instrument securely mounted to said support leg at its bottom.

5. In the surveying instrument of claim 2, said support leg having a bottom, and a carrying handle for said instrument securely mounted to said support leg at its bottom.

6. In the surveying instrument of claim 3, said support leg having a bottom, and a carrying handle for said instrument securely mounted to said support leg at its bottom.

7. In the surveying instrument of claim 1, said boll means comprising a pair of spaced threaded bolts, said first one of said jaws including a pair of spaced threaded bores, said pair of spaced threaded bolts threaded to their corresponding threaded bores in said first one of said jaws thereby fixing said first ozic of said jaws in said frame.

8. In the surveying instrument of claim 7, said advancing and retracting means comprising a threaded handle threadedly attached to said second one of said jaws through said frame in opposing relationship to said first one of said jaws.

9. In the surveying instrument of claim 8, said support leg having a bottom, and a carrying handle for said instrument securely mounted to said support leg at its bottom.

10. In the surveying instrument of claim 7, said support leg laving a bottom, and a carrying handle for said instrument securely mounted to said support leg at its bottom.

* * * * *